United States Patent
Nishimoto et al.

(10) Patent No.: US 6,335,399 B1
(45) Date of Patent: Jan. 1, 2002

(54) THERMOPLASTIC RESIN COMPOSITION

(75) Inventors: Kenji Nishimoto, Hyogo; Yoshihiko Hashimoto, Osaka, both of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/625,513

(22) Filed: Jul. 25, 2000

(30) Foreign Application Priority Data

Jul. 27, 1999 (JP) ................................... 11-212268

(51) Int. Cl.$^7$ ........................ C08F 212/08; C08F 212/10; C08F 222/40; C08F 255/00
(52) U.S. Cl. .............................. 525/71; 523/201
(58) Field of Search ................. 525/71; 523/201

(56) References Cited

U.S. PATENT DOCUMENTS

| | | | |
|---|---|---|---|
| 4,430,478 A | * | 2/1984 | Schmitt et al. ................. 525/71 |
| 5,229,457 A | | 7/1993 | Kamoshita et al. |
| 5,877,258 A | * | 3/1999 | Guntherberg et al. ......... 525/71 |

* cited by examiner

*Primary Examiner*—Jeffrey Mullis
(74) *Attorney, Agent, or Firm*—Armstrong, Westerman, Hattori, McLeland & Naughton, LLP

(57) ABSTRACT

The present invention provides a thermoplastic resin composition comprising (A) a graft copolymer containing a rubber having a small particle diameter, (B) a graft copolymer containing a rubber having a middle particle diameter, (C) an α-methylstyrene and/or maleimide-based copolymer having a reduced viscosity of from 0.45 to 1.2 and (D) a styrene-based copolymer having a reduced viscosity of from 0.20 to 0.45. The thermoplastic resin composition of the present invention is low in rigidity such as tensile strength, so ductile that its molded product shows no sharp edge on rupture cross-section upon collision, has a high resistance to thermal deformation and exhibits an excellent moldability.

2 Claims, 1 Drawing Sheet

THERMOPLASTIC RESIN COMPOSITION

FIELD OF THE INVENTION

The present invention relates to a thermoplastic resin composition. More particularly, the present invention relates to a thermoplastic resin composition which is low in rigidity such as tensile strength, so ductile that its molded product shows no sharp edge on rupture cross-section upon collision, has a high resistance to thermal deformation and exhibits an excellent moldability.

BACKGROUND ART

Because of its excellent impact resistance, thermal deformation resistance and moldability, an ABS resin (acrylonitrile-butadiene-styrene) finds wide application to automobile interior and exterior materials, housing and parts of household electrical appliances, and office automation equipments etc. In recent years, automobile interior and exterior materials have been required to provide safety upon collision such as side collision regulation that the rupture cross-section developed by collision must not show sharp edge in addition to excellent properties such as high temperature dimensional stability and external surface appearance.

In order to satisfy these requirements, many studies have been made. However, no ABS resins having satisfactory properties have been obtained. For example, JP-A-59-20346 (The term "JP-A" as used herein means an "unexamined published Japanese patent application") discloses an approach involving the addition of a specific plasticizer to a rubber-reinforced styrene resin. However, this approach leaves something to be desired because the resulting resin composition exhibits a deteriorated thermal deformation resistance and the plasticizer can evaporate. The use of a polypropylene-based resin having a specific composition has been studied. However, this approach is disadvantageous in that the resulting molded product has an impaired external surface appearance due to sinking, a deteriorated dimensional stability due to warpage and a deteriorated adhesion to other materials. Further, it has been practiced to fill the interior of these parts with a foamed polyethylene product. However, this approach is disadvantageous in that the production process is complicated and gives a poor economy.

Paying attention to the distribution of particle diameter of rubber in styrene-based resin, a method for improving impact resistance has been proposed. For example, JP-A-8-134312 and JP-A-8-134316 propose the combined use of a small particle diameter rubber and a middle particle diameter rubber.

However, none of these approaches provide a resin composition which exhibits a low rigidity, shows a ductile rupture cross-section in the form of molded product and has a high thermal deformation resistance and an excellent moldability.

SUMMARY OF THE INVENTION

The present invention gives solution to the foregoing problems and provides a thermoplastic resin composition which is low in rigidity such as tensile strength, so ductile that its molded product shows no sharp edge on rupture cross-section, has a high resistance to thermal deformation and exhibits an excellent moldability.

The inventors made extensive studies of solution to the foregoing problems with ABS resin. As a result, it was found that a thermoplastic resin composition having a great rubber content comprising (A) a specific graft copolymer containing a rubber having a small particle diameter and (B) a specific graft copolymer containing a rubber having a middle particle diameter incorporated therein in a specific proportion and comprising a (D) styrene-based copolymer having a low molecular weight incorporated therein is low in rigidity such as tensile strength, so ductile that its molded product shows no sharp edge on rupture cross-section, has a high resistance to thermal deformation and exhibits an excellent moldability. Thus, the present invention has been worked out.

The present invention lies in a thermoplastic resin composition having a rubber content of from 25 to 50% by weight based on the resin composition comprising from 2 to 20 parts by weight of a copolymer (A), from 30 to 68 parts by weight of a copolymer (B), from 5 to 35 parts by weight of a copolymer (C) and from 25 to 63 parts by weight a copolymer (D), totaling 100 parts by weight.

(A) Graft Copolymer Containing a Rubber Having a Small Particle Diameter

A graft copolymer obtained by the polymerization of from 40 to 90 parts by weight of at least one rubber polymer (R) selected from the group consisting of diene-based rubber polymer, acrylic rubber polymer, silicon-based rubber polymer and olefinic rubber polymer having a volume-average particle diameter of from 60 to 160 nm with from 10 to 60 parts by weight of a monomer mixture comprising from 10 to 90% by weight of an aromatic vinyl compound, one or more of a (meth)acrylic acid ester and a vinyl cyanide compound in an amount of from 10 to 90% by weight, and from 0 to 30% by weight of a monomer copolymerizable therewith, totaling 100% by weight;

(B) Graft Copolymer Containing a Rubber Having a Middle Particle Diameter

A graft copolymer obtained by the polymerization of from 40 to 90 parts by weight of at least one rubber polymer (R) selected from the group consisting of diene-based rubber polymer, acrylic rubber polymer, silicon-based rubber polymer and olefinic rubber polymer having a volume-average particle diameter of from 300 to 800 nm with from 10 to 60 parts by weight of a monomer mixture comprising from 10 to 90% by weight of an aromatic vinyl compound, one or more of a (meth)acrylic acid ester and a vinyl cyanide compound in an amount of from 10 to 90% by weight, and from 0 to 30% by weight of a monomer copolymerizable therewith, totaling 100% by weight;

(C) α-Methylstyrene and/or Maleimide-based Copolymer

An α-methylstyrene and/or maleimide-based copolymer having a methyl ethyl ketone soluble content reduced viscosity of from 0.45 to 1.2 dl/g (as determined at 30° C. in N,N-dimethylformamide solution) obtained by the polymerization of a monomer mixture comprising from 10 to 40% by weight of acrylonitrile, α-methylstyrene and/or maleimide in an amount of from 5 to 80% by weight, from 0 to 85% by weight of styrene, and from 0 to 20% by weight a monomer copolymerizable therewith, totaling 100% by weight; and (D) Styrene-based Copolymer A styrene copolymer having a methyl ethyl ketone soluble content reduced viscosity of from 0.20 to 0.45 dl/g (as determined at 30° C. in N,N-dimethylformamide solution) obtained by the polymerization of a monomer mixture comprising from 10 to 40% by weight of acrylonitrile, from 60 to 90% by weight of styrene, and from 0 to 20% by weight a monomer copolymerizable therewith, totaling 100% by weight.

BRIEF DESCRIPTION OF THE DRAWINGS

In FIG. 1 and FIG. 2, the unit of length is mm (millimeter).

DETAILED DESCRIPTION OF THE INVENTION

Figure 1:
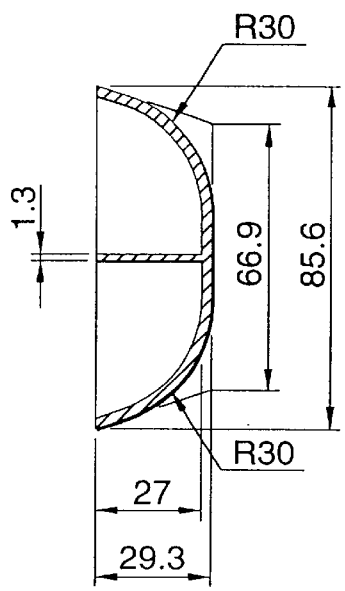
FIG. 1 is a sectional view of a pillar molded product made of the thermoplastic resin composition of the present invention.
Figure 2:
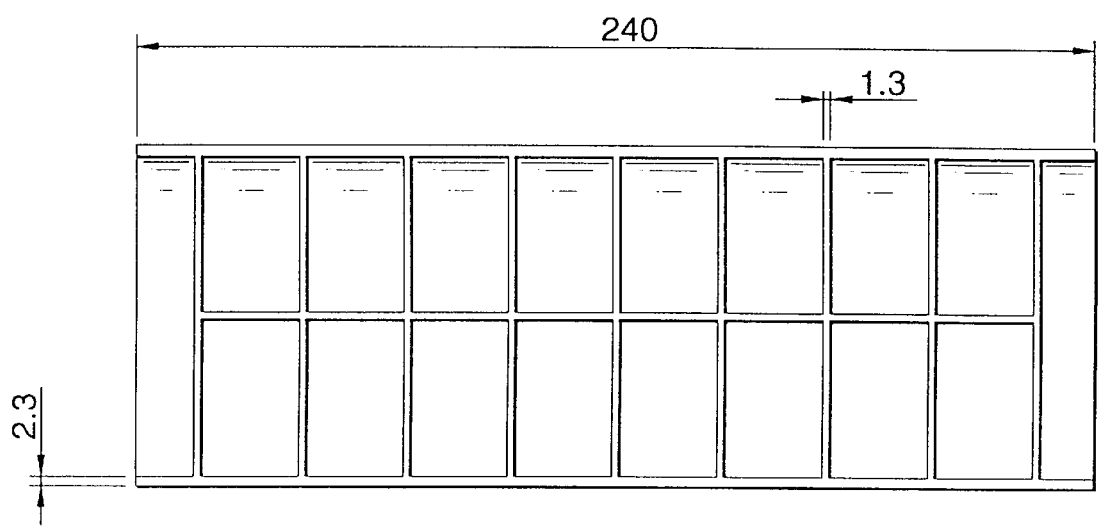
FIG. 2 is a plan view of a pillar molded product made of the thermoplastic resin composition of the present invention.

The graft copolymer in the resin composition of the present invention is characterized in that (A) a specific graft copolymer containing a rubber having a small particle diameter and (B) a specific graft copolymer containing a rubber having a middle particle diameter are incorporated in a specific proportion. When only the copolymer (A) or the copolymer (B) is incorporated, it is disadvantageous in that the resulting molded product is not ductile and shows sharp edge on rupture cross-section. The volume-average particle diameter of the rubber polymer (R) in the graft copolymer containing a rubber having a small particle diameter (A) is from 60 to 160 nm. More preferably, it is from 70 to 140 nm from the standpoint of the requirement that the molded product be ductile and shows no sharp edge on rupture cross-section. When the volume-average particle diameter of the rubber polymer (R) falls below 60 nm or exceeds 160 nm, the resulting resin has a deteriorated moldability and the resulting molded product is not ductile and shows sharp edge on rupture cross-section. The graft copolymer containing a rubber having a middle particle diameter (B) in the resin composition of the present invention be made of a rubber polymer (R) having a volume-average particle diameter of from 300 to 800 nm, and preferably the rubber polymer (R) is produced by a coagulation dilation method using an acid group-containing latex. More preferably, the volume-average particle diameter of the rubber (R) is from 320 to 700 nm from the standpoint of the requirement that the molded product be ductile and shows no sharp edge on rupture cross-section. When the volume-average particle diameter of the rubber polymer (R) falls below 300 nm or exceeds 800 nm, the resulting resin has a deteriorated moldability and the resulting molded product is not ductile and shows sharp edge on rupture cross-section.

Examples of the rubber polymer (R) include diene-based rubber polymer such as butadiene rubber, styrene-butadiene rubber and acrylonitrile-butadiene rubber, acrylic rubber polymer such as acrylic acid butyl rubber, butadiene-acrylic acid butyl rubber, 2-ethylhexyl acrylate-butyl acrylate rubber, 2-ethylhexyl methacrylate-butyl acrylate rubber, stearyl acrylate-butyl acrylate rubber, dimethyl siloxane-butyl acrylate rubber and silicon/butyl acrylate composite rubber, olefinic rubber polymer such as ethylene-propylene rubber and ethylene-propylene-diene rubber, and silicon rubber polymer such as polydimethyl siloxane. These rubber polymers may be used singly or in combination of two or more thereof.

It is preferable that the rubber polymer (R) is produced by a dilation method using an acid group-containing latex prepared by the polymerization of at least one unsaturated acid selected from the group consisting of acrylic acid, methacrylic acid, itaconic acid and crotonic acid, at least one (meth)alkyl acrylate having from 1 to 12 carbon atoms in the alkyl group moiety and a monomer copolymerizable therewith in an amount of from 5 to 50% by weight, from 50 to 95% by weight and from 0 to 40% by weight, respectively, based on 100 parts by weight (as calculated in terms of solid content) of the rubber latex.

The monomer mixture in the graft copolymer (A) and the graft copolymer (B) comprises an aromatic vinyl compound, a (meth) a crylic acid ester and/or vinyl cyanide compounds, and a monomer copolymerizable therewith in an amount of from 10 to 90% by weight, from 10 to 90% by weight and from 0 to 30% by weight, respectively, totaling 100% by weight. In order that the molded product shows no sharp edge on rupture cross-section and from the standpoint of moldability, the amount of the aromatic vinyl compound, the (meth)acrylic acid ester and/or the vinyl cyanide compounds, and the monomer copolymerizable therewith are preferably from 20 to 85% by weight, from 15 to 80% by weight and from 0 to 20% by weight, respectively, totaling 100% by weight, more preferably, from 25 to 85% by weight, from 15 to 75% by weight and from 0 to 10% by weight, respectively, totaling 100% by weight. When the amount of the aromatic vinyl compound falls below 10% by weight, the resulting resin composition exhibits a deteriorated workability. On the contrary, when the amount of the aromatic vinyl compound exceeds 90% by weight, the resulting resin composition shows sharp edge on rupture cross-section of molded product and exhibits a deteriorated workability.

Examples of the foregoing aromatic vinyl compound include styrene, α-methylstyrene, p-methylstyrene, p-isopropylstyrene, chlorostyrene, and bromostyrene. Examples of the vinyl cyanide compound include acrylonitrile, and methacrylonitrile. Examples of the (meth) acrylic acid ester compound include methacrylic acid ester having a $C_{1-18}$ alkyl group such as methyl methacrylate, ethyl methacrylate, butyl methacrylate, 2-ethylhexyl methacrylate and stearyl methacrylate, and acrylic acid ester having a $C_{1-18}$ alkyl group such as methyl acrylate, ethyl acrylate, butyl acrylate, 2-ethylhexyl acrylate and stearyl acrylate. Examples of the other copolymerizable monomers include (meth)acrylic acid derivative other than (meth) acrylic acid ester such as (meth)acrylic acid and glycidyl (meth)acrylate, and maleimide compound such as maleimide and N-phenylmaleimide. These monomers may be used singly or in combination of two or more thereof.

The α-methylstyrene and/or maleimide copolymer (C) can be obtained by the polymerization of a monomer mixture comprising acrylonitrile, α-methylstyrene and/or maleimide, styrene and a monomer copolymerizable therewith in an amount of from 10 to 40% by weight, from 5 to 80% by weight, from 0 to 85% by weight and from 0 to 20% by weight, respectively, preferably from 15 to 37% by weight, from 15 to 80% by weight, from 0 to 60% by weight and from 0 to 15% by weight, respectively. Examples of the foregoing maleimide include maleimide, N-methylmaleimide, N-ethylmaleimide, N-propylmaleimide, N-butylmaleimide, N-phenylmaleimide, and N-(p-methylphenyl)maleimide. The reduced viscosity of the methyl ethyl ketone soluble content is from 0.45 to 1.2 dl/g, preferably from 0.5 to 0.9 dl/g (as determined at 30° C. in N,N-dimethylformamide). When the reduced viscosity falls below 0.45 dl/g, the resulting molded product shows sharp edge on rupture cross-section. When the reduced viscosity exceeds 1.2 dl/g, the resulting resin composition exhibits a deteriorated workability.

The styrene-based copolymer (D) can be obtained by the polymerization of a monomer mixture comprising acrylonitrile, styrene and a monomer copolymerizable therewith in an amount of from 10 to 40% by weight, from 60 to 90% by weight and from 0 to 20% by weight, respectively, preferably from 15 to 37% by weight, from 63 to 85% by weight and from 0 to 10% by weight, respectively, totaling 100% by weight, more preferably from 20 to 35% by weight, from 65 to 80% by weight and from 0 to 7% by weight, respectively. The reduced viscosity of the methyl ethyl ketone soluble content is from 0.2 to 0.45 dl/g, preferably from 0.25 to 0.40 dl/g (as determined at 30° C. in N,N-dimethylformamide). When the reduced viscosity falls below 0.2 dl/g, the resulting molded product shows sharp edge on rupture cross-section. When the reduced viscosity exceeds 0.45 dl/g, the resulting resin composition exhibits a deteriorated workability.

Examples of the foregoing copolymerizable monomer include methacrylic acid ester having a $C_{1-18}$ alkyl group such as methyl methacrylate, ethyl methacrylate, butyl methacrylate, 2-ethylhexyl methacrylate and stearyl methacrylate, acrylic acid ester having a $C_{1-18}$ alkyl group such as methyl acrylate, ethyl acrylate, butyl acrylate, 2-ethylhexyl acrylate and stearyl acrylate, (meth)acrylic acid derivative other than (meth)acrylic acid ester such as (meth) acrylic acid and glycidyl (meth)acrylate, α-methylstyrene, p-methylstyrene, p-isopropylstyrene, chlorostyrene, bromostyrene, and methacrylonitrile. These monomers may be used singly or in combination of two or more thereof.

The thermoplastic resin composition according to the present invention is a thermoplastic resin composition comprising the foregoing (A) graft copolymer containing a rubber having a small particle diameter, (B) graft copolymer containing a rubber having a middle particle diameter, (C) α-methylstyrene and/or maleimide-based copolymer and (D) styrene-based copolymer in an amount of from 2 to 20 parts by weight, from 30 to 68 parts by weight, from 5 to 35 parts by weight and from 25 to 63 parts by weight, respectively, preferably from 2 to 15 parts by weight, from 35 to 65 parts by weight, from 7 to 12 parts by weight and from 30 to 55 parts by weight, respectively, totaling 100 parts by weight and having a rubber content of from 25 to 50 based on the weight of the resin composition.

When the amount of these components fall outside the above defined range, the resulting resin composition exhibits a deteriorated moldability or the resulting molded product shows sharp edge on rupture cross-section.

The thermoplastic resin composition according to the present invention has a rubber polymer (R) content of from 25 to 50% by weight, preferably from 25 to 45% by weight based on the resin composition. When the rubber polymer (R) content falls below 20% by weight based on the resin composition, the resulting molded product shows sharp edge on rupture cross-section. On the contrary, when the rubber polymer (R) content exceeds 50% by weight, the resulting resin composition exhibits a deteriorated moldability.

The graft copolymers (A) and (B), α-methylstyrene and/or maleimide-based copolymer (C) and styrene-based copolymer (D) may be produced by any polymerization method so far as the composition falling within the scope of the present invention can be obtained. For example, any polymerization method may be used such as known bulk polymerization, solution polymerization, suspension polymerization, emulsion polymerization, emulsion-suspension polymerization and emulsion-bulk polymerization so far as the composition can be controlled to that falling within the scope of the present invention. For the graft copolymers (A) and (B), emulsion polymerization method is preferably used because it allows easy control over percent grafting.

The graft copolymers (A) and (B), α-methylstyrene and/or maleimide-based copolymer (C) and styrene-based copolymer (D) may be produced in the presence of any initiator, chain transfer agent and emulsifier so far as the composition falling within the scope of the present invention can be obtained. As the initiator there may be used any known initiator such as thermal decomposition initiator (e.g., potassium persulfate) and redox initiator (e.g., Fe-reducer-organic peroxide). As the chain transfer agent there may be used any known chain transfer agent such as t-dodecylmercaptan, n-dodecylmercaptan, α-methylstyrene dimer and terpinolene. As the emulsifier there may be used any known emulsifier such as aliphatic acid metal salt-based emulsifer (e.g., sodium oleate, sodium palmitate, sodium rhodinate) and sulfonic acid metal salt-based emulsifier (e.g., sodium dodecylbenzenesulfonate, $C_{12-20}$ sodium alkylsulfonate, sodium dioctylsulfosuccinate).

The thermoplastic resin composition of the present invention may properly comprise a conventional well-known oxidation inhibitor, heat stabilizer, UV absorber, pigment, antistatic agent or lubricant incorporated therein as necessary. In particular, phenolic, sulfur-based, phosphoric and hindered amine-based stabilizers and oxidation inhibitors, benzophenone-based and benzotriazole-based ultraviolet absorbers and lubricants such as organopolysiloxane, aliphatic hydrocarbon and ester of higher aliphatic acid with higher alcohol, which are used in styrene-based resins, may be used to provide higher performances as molding resin. These additives may be used singly or in admixture.

The graft copolymers (A) and (B), α-methylstyrene and/or maleimide-based copolymer (C) and styrene-based copolymer (D) may be mixed in the form of latex, slurry, solution, powder, pellet or combination thereof during production, though depending on the process for the preparation of these copolymers. The recovery of the polymer powder from the latex comprising the graft copolymers (A) and (B), α-methylstyrene and/or maleimide-based copolymer (C) and styrene-based copolymer (D) can be carried out by any ordinary method such as method which comprises adding an alkaline earth metal salt such as calcium chloride, magnesium chloride and magnesium sulfate, an alkaline metal salt such as sodium chloride and sodium sulfate or an inorganic or organic acid such as hydrochloric acid, sulfuric acid, phosphoric acid and acetic acid to the latex so that the latex is coagulated, and then dehydrating and drying the latex. Alternatively, spray drying method may be used. Further, a fraction of the stabilizer to be used may be added to the latex or slurry of resin in the form of dispersion.

The thermoplastic resin composition of the present invention may be produced by subjecting a mixture of powder or pellet of one or more of the graft copolymers (A) and (B), α-methylstyrene and/or maleimide-based copolymer (C) and styrene-based copolymer (D) optionally blended with a stabilizer, lubricant, pigment, etc. to kneading by a known melt-kneader such as Banbury mixer, roll mill, single-screw extruder and twin-screw extruder.

The thermoplastic resin composition of the present invention can be worked into molded product by any known working method such as injection molding, extrusion, vacuum molding and blow molding. Further, the thermoplastic resin composition of the present invention can be used for parts for which it can effectively exhibit its characteristics that it is so ductile that its molded product shows no sharp edge on rupture cross-section and exhibits a high thermal deformation resistance. In some detail, the thermoplastic resin composition of the present invention is particularly suitable for automobile parts such as interior parts integrated with peripheral parts (e.g., such as front pillar garnish, side roof garnish and center pillar garnish) and exterior parts, such as wheel cap, radiator grill, side mat guard, aeroparts and side protector parts.

The present invention will be further described in the following examples. However, these examples are only illustrative. The present invention is not limited to these examples. The term "parts" and "%" as used hereinafter are meant to indicate "parts by weight" and "% by weight", respectively, unless otherwise specified.

The abbreviations used in these examples have the following meaning.

BA: Butyl acrylate
BMA: Butyl methacrylate
St: Styrene
MAA: Methacrylic acid
tDM: t-Dodecylmercaptan
CHP: Cumene hydroperoxide
EDTA: Ethylenediaminetetraacetic acid
PBd: Polybutadiene
αMSt: α-Methylstyrene
AN: Acrylonitrile
PMI: N-phenylmaleimide

PREPARATION EXAMPLE (1) Production of Graft Polymer Containing a Rubber Having a Small Particle Diameter (A)

(1-1) Production of Polybutadiene

A rubber latex having an average particle diameter of 90 nm (a-1) was obtained by a known method. For the evaluation of the average particle diameter of latex, a Type NICOMP particle size measuring instrument produced by PACIFIC SCIENTIFIC CO. was used.

(1-2) Production of Graft Polymer Containing a Rubber Having a Small Particle Diameter (A)

Into a reactor equipped with a stirrer, a reflux condenser, a nitrogen inlet, a monomer inlet and a thermometer were charged the following materials. The contents of the reactor were then heated to a temperature of 60° C. in a stream of nitrogen with stirring.

| | |
|---|---|
| Pure water | 200 parts |
| Rubber-like polymer (solid content) | Kind and amount set forth in Table 1 |
| Sodium formaldehyde sulfoxylate | 0.2 parts |
| EDTA | 0.01 parts |
| Ferrous chloride | 0.0025 parts |

After the temperature reached 60° C., the monomer mixture set forth in Table 1 was then continuously added dropwise to the reaction mixture in 4 hours. After the termination of dropwise addition, the reaction mixture was then further stirred at a temperature of 60° C. for 1 hour to terminate polymerization and to obtain a graft copolymer (A-1).

TABLE 1

| | Rubber particle diameter (nm) | A-1* |
|---|---|---|
| Polybutadiene (a-1) | 90 | 60 |
| St | | 28 |
| AN | | 12 |
| tDM | | 0.1 |
| CHP | | 0.1 |

*parts by weight (2) Production of Graft Copolymer Containing a Rubber Having a Middle Particle Diameter (B)

(2-1) Production of Acid Group-containing Latex

An acid group-containing latex to be dilated was produced as follows. Firstly, into a reactor equipped with a stirrer, a reflex condenser, a nitrogen inlet, a monomer inlet and a thermometer were charged the following materials.

| | |
|---|---|
| Pure water | 200 parts |
| Sodium dioctylsulfosuccinate | 0.5 parts |
| Sodium formaldehydesulfoxylate | 0.3 parts |

The reaction mixture was heated to a temperature of 70° C. in a stream of nitrogen with stirring. After the temperature of the reaction mixture reached 70° C., the following components were then continuously added dropwise to the reaction mixture in 1.5 hours.

| | |
|---|---|
| BA (butyl acrylate) | 24 parts |
| MAA (methacrylic acid) | 1 part |
| tDM (t-dodecylmercaptan) | 0.1 parts |
| CHP (cumene hydroperoxide) | 0.03 parts |

Subsequently, the following components were continuously added dropwise to the reaction mixture in 3.5 hours. After the termination of dropwise addition, the reaction mixture was then further stirred at a temperature of 65° C. for 1 hour to terminate polymerization.

| | |
|---|---|
| BA | 3 parts |
| BMA (butyl methacrylate) | 58 parts |
| MAA | 14 parts |
| tDM | 0.3 parts |
| CHP | 0.08 parts |

(2-2) Dilation Method

To the polybutadiene rubber (a-1) obtained in the above step (1-1) were collectively added 3 parts of the acid group-containing latex obtained in the step (2-1). The reaction mixture was then stirred for 1 hour to complete dilation. Thus, a polybutadiene rubber latex having a particle diameter of 470 nm (b-1) was obtained.

Similarly, to the polybutadiene rubber (a-1) obtained in the step (1-1) were collectively added 4 parts of the acid group-containing latex obtained in the step (2-1). The reaction mixture was then stirred for 1 hour to complete dilation. Thus, a polybutadiene rubber latex having a particle diameter of 350 nm (b-2) was obtained.

For the evaluation of the average particle diameter of latex, a Type NICOMP particle diameter measuring instrument produced by PACIFIC SCIENTIFIC INC. was used.

(2-3) Production of Graft Polymer Containing a Rubber Having a Middle Particle Diameter (B)

Into a reactor equipped with a stirrer, a reflux condenser, a nitrogen inlet, a monomer inlet and a thermometer were charged the following materials. The contents of the reactor were then heated to a temperature of 60° C. in a stream of nitrogen with stirring.

| | |
|---|---|
| Pure water | 200 parts |
| Rubber-like polymer (solid content) | Kind and amount set forth in Table 2 |
| Sodium formaldehyde sulfoxylate | 0.2 parts |
| EDTA | 0.01 parts |
| Ferrous chloride | 0.0025 parts |

After the temperature reached 60° C., the monomer mixture set forth in Table 1 was then continuously added dropwise to the reaction mixture in 4 hours. After the termination of dropwise addition, the reaction mixture was then further stirred at a temperature of 60° C. for 1 hour to terminate polymerization and to obtain a graft copolymer (B-1) and (B-2).

TABLE 2

|  | Rubber particle diameter (nm) | B-1* | B-2* |
|---|---|---|---|
| Dilated polybutadiene (b-1) | 470 | 60 | — |
| Dilated polybutadiene (b-2) | 350 | — | 60 |
| St |  | 28 | 28 |
| AN |  | 12 | 12 |
| tDM |  | 0.1 | 0.1 |
| CHP |  | 0.1 | 0.1 |

*parts by weight (3) Production of α-methylstyrene and/or Maleimide-based Copolymer (C) and Styrene-based Copolymer (D)

Into a reactor equipped with a stirrer, a reflux condenser, a nitrogen inlet, a monomer inlet and a thermometer were charged the following materials and the monomer mixture (I) set forth in Table 3. The contents of the reactor were then heated to a temperature of 65° C. in a stream of nitrogen with stirring.

| Pure water | 200 parts |
|---|---|
| Sodium dioctylsulfosuccinate | 1 part |
| Sodium formaldehyde sulfoxylate | 0.4 parts |
| EDTA | 0.01 parts |
| Ferrous chloride | 0.0025 parts |

After the temperature reached 65° C., the monomer mixture (II) set forth in Table 3 was then continuously added dropwise to the reaction mixture in 6 hours. When 1 hour of polymerization passed, 0.5 parts of sodium dioctylsulfosuccinate were added to the reaction mixture. When 3 hours of polymerization passed, 0.5 parts of sodium dioctylsulfosuccinate were added to the reaction mixture. After the termination of dropwise addition, the reaction mixture was then further stirred at a temperature of 65° C for 1 hour to terminate polymerization. Thus, α-methylstyrene and/or maleimide-based copolymers (C-1), (C-2) and (C-3) and styrene-based copolymers (D-1) and (D-2) were obtained.

For comparison, the component (D-2) exhibited a reduced viscosity falling outside the range defined in the claim.

TABLE 3

|  | C-1* | C-2* | C-3* | D-1* | D-2* |
|---|---|---|---|---|---|
| Monomer I |  |  |  |  |  |
| αMSt | — | 50 | — | — | — |
| tDM | — | 0.1 | — | — | — |
| Monomer II |  |  |  |  |  |
| αMSt | 50 | 20 | — | — | — |
| St | 20 | 5 | 55 | 70 | 70 |
| AN | 30 | 25 | 25 | 30 | 30 |
| PMI | — | — | 20 | — | — |
| tDM | 0.3 | 0.2 | 0.3 | 0.9 | 0.2 |
| CHP | 0.3 | 0.3 | 0.3 | 0.1 | 0.1 |
| Reduced viscosity (dl/g)** | 0.58 | 0.64 | 0.62 | 0.39 | 0.66 |

*parts by weight
**determined at 30° C. in N,N-dimethylformamide solution (4) Production of Thermoplastic Resin Composition (E)

The graft copolymer latex containing a rubber having a small particle diameter (A), graft copolymer latex containing a rubber having a middle particle diameter (B), α-methylstyrene and/or maleimide-based copolymer (C) and styrene-based copolymer (D) thus produced were mixed in a proportion set forth in Table 4. To the mixture were then added 0.5 parts of a phenolic stabilizer. To the mixture were then added 2 parts of calcium chloride so that it was coagulated. The coagulated slurry was then dehydrated and dried to obtain powders of thermoplastic resin compositions (E-1) to (E-8).

Subsequently, to 100 parts of thermoplastic resin compositions having mixing proportions set forth in Table 4 were each added 0.3 parts of a phosphoric stabilizer PEP-24G (produced by ASAHI DENKA KOGYO K.K.) and 0.3 parts of a phenolic stabilizer A0-20 (produced by ASAHI DENKA KOGYO K.K.). The mixture was then uniformly blended by a Type 201 blender produced by K.K. TABATA. The mixture was melt-kneaded through a single-screw (having diameter of 40 mm) extruder of a diameter produced by K.K. TABATA to produce a pelletized material. The pelletized material was then molded at a cylinder temperature of from 250° C. to 270° C. through a Type 100B injection molding machine produced by FANUC. LTD. to prepare test specimens to be evaluated for physical properties. The results of evaluation are set forth in Table 4.

TABLE 4

|  | Inventive Examples |  |  |  |  | Comparative Examples |  |  |
|---|---|---|---|---|---|---|---|---|
|  | E-1* | E-2* | E-3* | E-4* | E-5* | E-6* | E-7* | E-8* |
| A-1 | 5 | 3 | 10 | 10 | 15 | 5 | — | 55 |
| B-1 | 45 | 55 | 4.5 | — | 45 | 45 | 50 | — |
| B-2 | — | — | — | 4.5 | — | — | — | — |
| C-1 | 10 | 7 | — | — | — | 10 | 10 | — |
| C-2 | — | — | 10 | 10 | — | — | — | 10 |
| C-3 | — | — | — | — | 10 | — | — | — |
| D-1 | 40 | 35 | 35 | 35 | 30 | — | 40 | 35 |
| D-2 | — | — | — | — | — | 40 | — | — |
| % Rubber content | 30.0 | 34.8 | 33.0 | 33.0 | 36.0 | 30.0 | 30.0 | 33.0 |
| Rupture cross-section | Ductile | Ductile | Ductile | Ductile | Ductile | Ductile | Brittle | Brittle |
| TS | 345 | 300 | 310 | 310 | 290 | 350 | 350 | 315 |
| HDT | 88 | 88 | 90 | 90 | 90 | 89 | 88 | 88 |
| Spiral flow | 750 | 730 | 700 | 705 | 680 | 570 | 710 | 630 |

"*": parts by weight (5) Evaluation (5-1) Rupture Cross-section of Molded Product The pillar molded products having a shape set forth in FIG. 1 were each subjected to falling ball impact test with a 4.5 Kg load at a rate of 24 km/Hr to see which it is ductile (shows no sharp edge) or brittle (shows sharp edge) on rupture cross-section.

(5-2) Tensile Strength (TS)

The specimen was evaluated for tensile strength at a temperature of 23° C. in accordance with ASTM D-638 (unit: kg/cm$^2$)

(5-3) Heat Resistance (HDT)

For the evaluation of heat resistance (HDT), the specimen was measured for thermal deformation temperature at a load of 18.6 kg/cm$^2$ in accordance with ASTM D-648 (unit: ° C.).

(5-4) Moldability (SPL: Spiral Flow)

For the evaluation of moldability, the specimen was measured for length of flow of resin in a spiral mold having a thickness of 3 mm at a cylinder temperature of 250° C. and an injection pressure of 1,350 kg/cm$^2$ using a Type 100B injection molding machine produced by FANUC LTD. (unit: mm).

The thermoplastic resin composition according to the present invention is a thermoplastic resin composition which is low in rigidity such as tensile strength, so ductile that its molded product shows no sharp edge on rupture cross-section upon collision, has a high resistance to thermal deformation and exhibits an excellent moldability.

While the invention has been described in detail and with reference to specific examples thereof, it will be apparent to one skilled in the art that various changes and modifications can be made therein without departing from the spirit and scope thereof.

What is claimed is:

1. A thermoplastic resin composition comprising the following copolymers (A), (B), (C) and (D) in an amount of from 2 to 20 parts by weight, from 30 to 68 parts by weight, from 5 to 35 parts by weight and from 25 to 63 parts by weight, respectively, totaling 100 parts by weight and having a rubber content of from 25 to 50 based on the weight of the resin composition:

(A) Graft Copolymer Containing a Rubber Having a Small Particle Diameter a graft copolymer obtained by the polymerization of from 40 to 90 parts by weight of at least one rubber polymer (R) selected from the group consisting of diene-based rubber polymer, acrylic rubber polymer, silicon-based rubber polymer and olefinic rubber polymer having a volume-average particle diameter of from 60 to 160 nm with from 10 to 60 parts by weight of a monomer mixture comprising an aromatic vinyl compound, one or more of a (meth)acrylic acid ester and a vinyl cyanide compound and a monomer copolymerizable therewith in an amount of from 10 to 90% by weight, from 10 to 90% by weight and from 0 to 30% by weight, respectively, totaling 100% by weight;

(B) Graft Copolymer Containing a Rubber Having a Middle Particle Diameter a graft copolymer obtained by the polymerization of from 40 to 90 parts by weight of at least one rubber polymer (R) selected from the group consisting of diene-based rubber polymer, acrylic rubber polymer, silicon-based rubber polymer and olefinic rubber polymer having a volume-average particle diameter of from 300 to 800 nm with from 10 to 60 parts by weight of a monomer mixture comprising an aromatic vinyl compound, one or more of a (meth)acrylic acid ester and a vinyl cyanide compound and a monomer copolymerizable therewith in an amount of from 10 to 90% by weight, from 10 to 90% by weight and from 0 to 30% by weight, respectively, totaling 100% by weight;

(C) α-methylstyrene and/or Maleimide-based Copolymer an α-methylstyrene and/or maleimide-based copolymer having a methyl ethyl ketone soluble content reduced viscosity of from 0.45 to 1.2 dl/g (as determined at 30° C. in N,N-dimethylformamide solution) obtained by the polymerization of a monomer mixture comprising acrylonitrile, α-methylstyrene and/or maleimide, styrene and a monomer copolymerizable therewith in an amount of from 10 to 40% by weight, from 5 to 80% by weight, from 0 to 85% by weight and from 0 to 20% by weight, respectively, totaling 100% by weight; and (D) Styrene-based Copolymer a styrene copolymer having a methyl ethyl ketone soluble content reduced viscosity of from 0.20 to 0.45 dl/g (as determined at 30° C. in N,N-dimethylformamide solution) obtained by the polymerization of a monomer mixture comprising acrylonitrile, styrene and a monomer copolymerizable therewith in an amount of from 10 to 40% by weight, from 60 to 90% by weight and from 0 to 20% by weight, respectively, totaling 100% by weight.

2. The thermoplastic resin composition according to claim 1, wherein the rubber polymer to be incorporated in said graft copolymer (B) is a rubber polymer produced by a method using an acid group-containing latex.

* * * * *